US008961893B2

(12) United States Patent
Fleming et al.

(10) Patent No.: US 8,961,893 B2
(45) Date of Patent: Feb. 24, 2015

(54) AUTOMATED CHEMICAL DILUTER SYSTEM HAVING DISPOSABLE COMPONENTS

(75) Inventors: Wayne Anthony Fleming, Dallas, TX (US); Jose Eduardo G. Evaro, Mansfield, TX (US)

(73) Assignee: NCH Corporation, Irving, TX (US)

( * ) Notice: Subject to any disclaimer, the term of this patent is extended or adjusted under 35 U.S.C. 154(b) by 1050 days.

(21) Appl. No.: 12/498,793

(22) Filed: Jul. 7, 2009

(65) Prior Publication Data

US 2011/0008220 A1 Jan. 13, 2011

(51) Int. Cl.
*B01J 8/00* (2006.01)
*B01F 1/00* (2006.01)

(52) U.S. Cl.
CPC ....... *B01F 1/0027* (2013.01); *B01F 2001/0061* (2013.01)
USPC ........... 422/255; 422/259; 422/271; 422/292; 422/303; 422/521; 222/57; 222/638; 222/639; 222/641; 222/642; 222/644; 222/129

(58) Field of Classification Search
USPC ......... 422/521, 523, 533, 501, 509, 547, 549, 422/560, 565, 292, 303, 264, 269, 271, 255, 422/259; 222/460, 500, 540, 288, 330, 333, 222/57, 638–639, 641, 642, 644, 651, 222/129.3, 129.4
See application file for complete search history.

(56) References Cited

U.S. PATENT DOCUMENTS 3,055,856 A 9/1962 Sutherland, Jr.
3,152,983 A 10/1964 Davis et al.
3,220,706 A 11/1965 Valdespino
3,242,055 A 3/1966 DeLucia
3,617,538 A 11/1971 Bogert
3,625,398 A * 12/1971 Tometsko ........................ 222/52
3,642,257 A 2/1972 Tanaka et al.
4,051,204 A 9/1977 Muller et al.
4,116,246 A * 9/1978 Franzen ........................ 141/362
4,162,795 A * 7/1979 Kanics .......................... 277/628
4,244,815 A 1/1981 Chaikin et al.
4,426,450 A 1/1984 Donofrio
4,609,153 A * 9/1986 van der Lely ................. 239/665
4,790,981 A * 12/1988 Mayer et al. .................. 422/263
4,797,208 A 1/1989 Miller et al.
4,810,385 A 3/1989 Hater et al.
4,832,848 A 5/1989 Velebil et al.

(Continued)

FOREIGN PATENT DOCUMENTS

DE 19507456 3/1995
EP 0130499 6/1984

(Continued)

*Primary Examiner* — Brian R Gordon
(74) *Attorney, Agent, or Firm* — Monty L. Ross; Robin L. Barnes; Ross Barnes LLP

(57) ABSTRACT

A chemical diluter system includes a housing. A container is mounted in the housing and is adapted for storing soluble flowable chemical solids. A mixing chamber is disposed within the housing and adjacent to the container. A disposable dispenser is attached to the container for automatically dispensing a measured amount of the chemical solids from the container into the mixing chamber via gravity flow. The mixing chamber is adapted to receive fluid for dissolution of the chemical solids and for dispensing a diluted chemical solution of the chemical solids.

10 Claims, 5 Drawing Sheets

(56) References Cited

U.S. PATENT DOCUMENTS

| | | | | | |
|---|---|---|---|---|---|
| 4,840,905 | A | | 6/1989 | Kearns et al. | |
| 4,883,759 | A | | 11/1989 | Hopkins | |
| 4,888,294 | A | | 12/1989 | Van Wezell et al. | |
| 4,911,832 | A | | 3/1990 | Miller et al. | |
| 4,925,564 | A | | 5/1990 | Francis | |
| 4,960,706 | A | | 10/1990 | Bliem et al. | |
| 5,162,204 | A | | 11/1992 | Matsuzaki et al. | |
| 5,225,083 | A | | 7/1993 | Pappas | |
| 5,232,664 | A | * | 8/1993 | Krawzak et al. | 422/64 |
| 5,251,656 | A | * | 10/1993 | Sexton, Sr. | 137/1 |
| 5,275,943 | A | | 1/1994 | DiTuro | |
| 5,350,543 | A | | 9/1994 | Spradley | |
| 5,369,032 | A | | 11/1994 | Pratt | |
| 5,401,501 | A | | 3/1995 | Pratt | |
| 5,426,024 | A | | 6/1995 | Flores-Cotera et al. | |
| 5,447,866 | A | | 9/1995 | Runyon | |
| 5,470,544 | A | * | 11/1995 | Galloway | 422/213 |
| 5,516,687 | A | | 5/1996 | Perez et al. | |
| 5,525,301 | A | | 6/1996 | Newberg et al. | |
| 5,626,260 | A | * | 5/1997 | Waldner | 222/144 |
| 5,654,197 | A | | 8/1997 | Jem et al. | |
| 5,716,630 | A | | 2/1998 | Lin et al. | |
| 5,739,031 | A | | 4/1998 | Runyon | |
| 5,770,079 | A | | 6/1998 | Haase | |
| 5,849,253 | A | * | 12/1998 | Crossdale et al. | 422/264 |
| 5,911,877 | A | | 6/1999 | Perez et al. | |
| 5,988,461 | A | * | 11/1999 | Edney et al. | 222/638 |
| 5,998,184 | A | | 12/1999 | Shi | |
| 6,168,949 | B1 | | 1/2001 | Rubenberger | |
| 6,190,591 | B1 | | 2/2001 | Van Lengerich | |
| 6,254,886 | B1 | | 7/2001 | Fusca et al. | |
| 6,280,719 | B1 | | 8/2001 | Suh | |
| 6,325,934 | B1 | | 12/2001 | Tobet, Jr. et al. | |
| 6,335,191 | B1 | | 1/2002 | Kiplinger et al. | |
| 6,562,585 | B1 | | 5/2003 | Hiatt | |
| 6,723,526 | B1 | | 4/2004 | Hernandez et al. | |
| 6,733,781 | B2 | | 5/2004 | Abu-Izza et al. | |
| 7,081,361 | B2 | | 7/2006 | Pearce et al. | |
| 7,099,740 | B2 | * | 8/2006 | Bartholomew et al. | 700/231 |
| 7,121,429 | B2 | * | 10/2006 | Bartholomew et al. | 222/1 |
| 1,618,461 | A1 | | 2/2007 | Matchette | |
| 7,223,075 | B2 | * | 5/2007 | Schmitt | 416/185 |
| 2005/0032032 | A1 | | 2/2005 | Pearce, III et al. | |
| 2005/0054086 | A1 | | 3/2005 | Ophardt | |
| 2007/0295755 | A1 | | 12/2007 | Kinzie et al. | |
| 2008/0047972 | A1 | * | 2/2008 | Bartholomew et al. | 222/1 |

FOREIGN PATENT DOCUMENTS

| | | |
|---|---|---|
| EP | 0487867 | 10/1991 |
| FR | 2044546 | 2/1971 |
| GB | 2162195 | 1/1986 |
| JP | 03266974 | 11/1991 |
| WO | WO 02079497 | 10/2002 |
| WO | WO 03016460 | 2/2003 |

* cited by examiner

AUTOMATED CHEMICAL DILUTER SYSTEM HAVING DISPOSABLE COMPONENTS

TECHNICAL FIELD OF THE INVENTION

The present invention relates to chemical diluters for the dissolution of a solid concentrated chemical product, and more particularly to a diluter system having disposable components.

BACKGROUND ART OF THE INVENTION

Typical automated devices for dissolution of a solid concentrated chemical product, such as for example, pelletized, granular or powdered form, require an electric motor driven pump for mixing, transferring liquid or dispensing. Such diluters also require periodic manual cleaning which is time consuming and costly.

A need has arisen for a diluter system that accomplishes the transfer of liquids, solution mixing and dispensing all facilitated without the use of complex pumping systems and which utilizes the benefit of gravity flow to form a compact system. A need has further arisen for a system that utilizes key recyclable components resulting in a maintenance free diluter system and which eliminates time consuming manual cleaning.

SUMMARY OF THE INVENTION

In accordance with the present invention, a chemical diluter system is provided. The system includes a housing. A container is mounted in the housing and is adapted for storing soluble flowable chemical solids. A mixing chamber is disposed within the housing and adjacent to the container. A disposable dispenser is attached to the container for automatically dispensing a measured amount of the chemical solids from the container into the mixing chamber via gravity flow. The mixing chamber is adapted to receive fluid for dissolution of the chemical solids and for dispensing a diluted chemical solution of the chemical solids.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1:
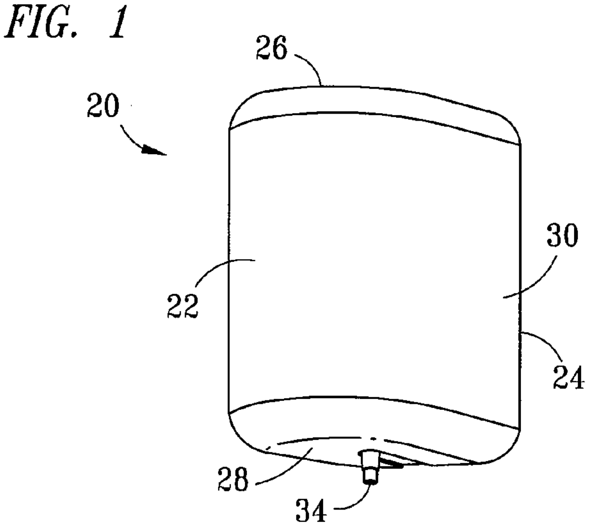
FIG. 1 is a perspective view of the present diluter system.
Figure 2:
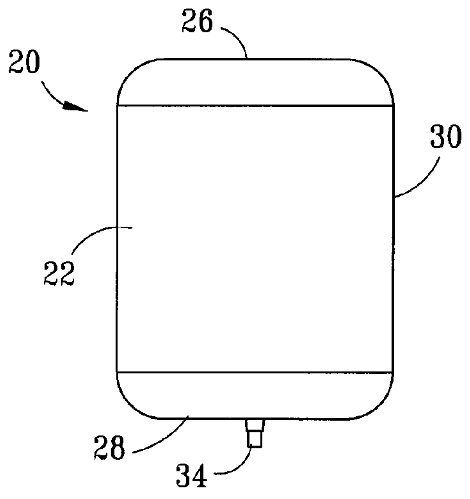
FIG. 2 is a front elevation view of the present diluter system illustrated in FIG. 1.
Figure 3:
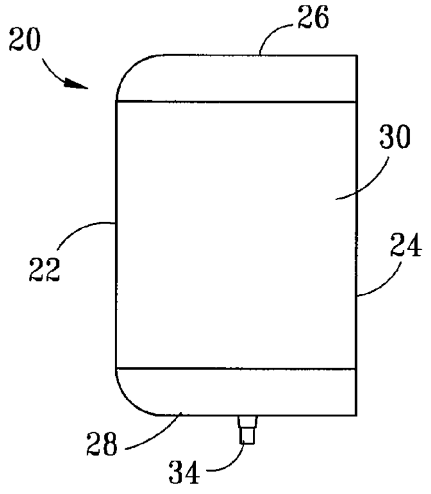
FIGS. 3 is a side elevational view of the present diluter system illustrated in FIG. 1.
Figure 4:
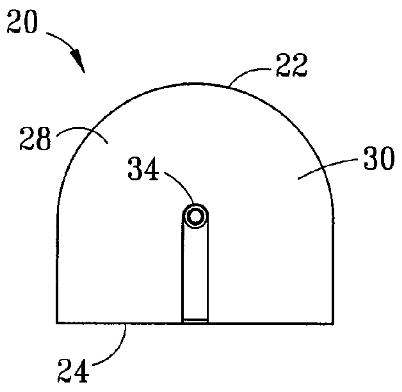
FIGS. 4 is a bottom plan view of the present diluter system illustrated in FIG. 1.
Figure 5:
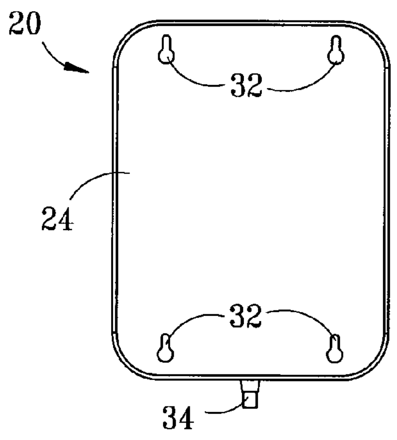
FIG. 5 is a rear elevational view of the present diluter system illustrated in FIG. 1.

Referring simultaneously to FIGS. 1-5, the present automated chemical diluter system is illustrated, and is generally identified by the numeral 20. Diluter system 20 includes a removable cover 30 which is completely removable to facilitate access to the interior of diluter system 20 for maintenance and chemical solids replacement. Cover 30 includes a front 22, top 26 and bottom 28. Extending from bottom 28 of cover 30 is an outlet port 34 for the dispensing of diluted chemical solutions of the chemical solids.

Diluter system 20 includes a base 24 (FIG. 5) which includes slotted screw apertures 32 for mounted diluter system 20 to a support structure, such as for example, a wall.

Figure 6:
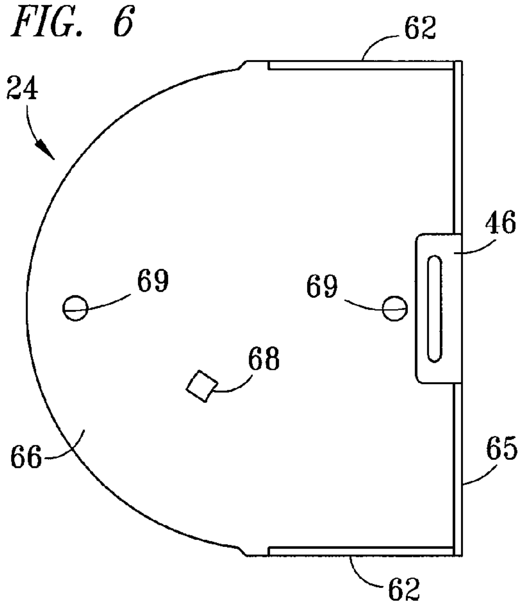
FIG. 6 is a top plan view of the base utilized with the present diluter system.
Figure 7:
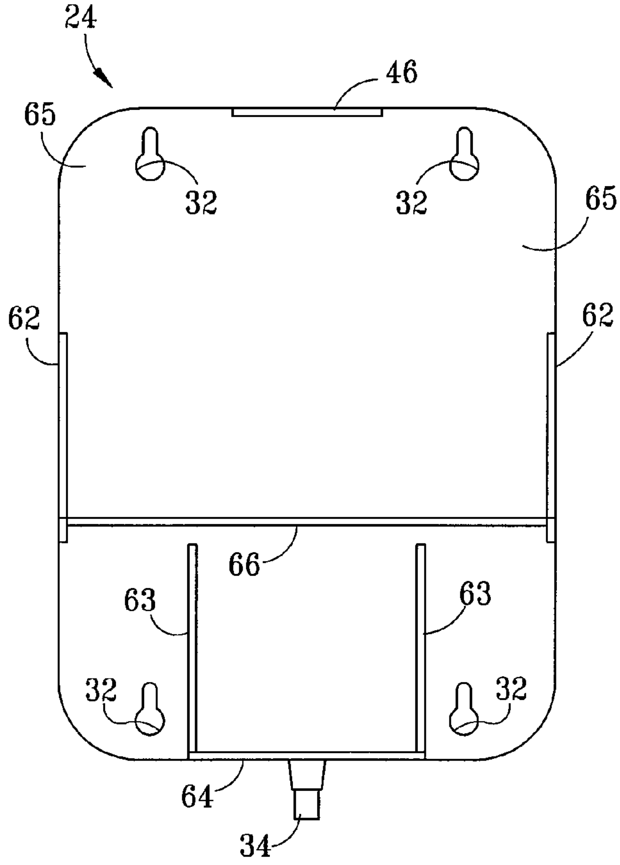
FIG. 7 is a front elevational view of the base illustrated in FIG. 6 utilized with the present diluter system.
Figure 8:
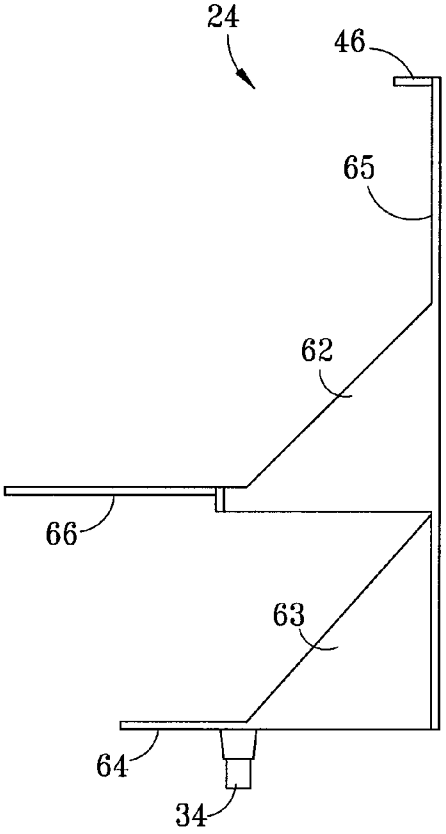
FIG. 8 is a side elevational view of the base utilized with the present diluter system.

Referring simultaneously to FIG. 6-8, base 24 of diluter system 20 includes a vertical wall mounting face plate 65. Base plate 65 includes a bracket 46 for mounting cover 30 (FIG. 1) to base 24. Base plate 65 includes a horizontal upper base plate 66 on which the components of diluter system 20 are mounted. Base plate 66 is integral with face plate 65, and is further connected to face plate 65 utilizing support members 62.

Figure 9:
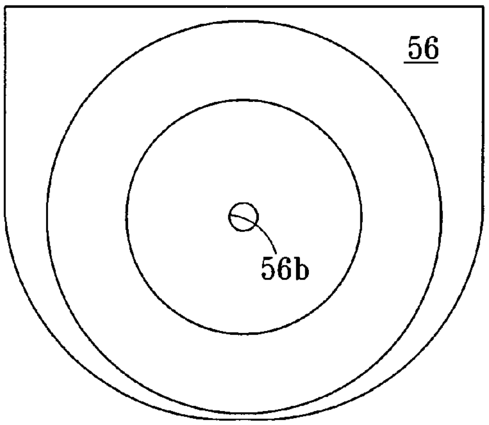
FIG. 9 is a bottom plan view of the mix tank utilized with the present diluter system.
Figure 10:
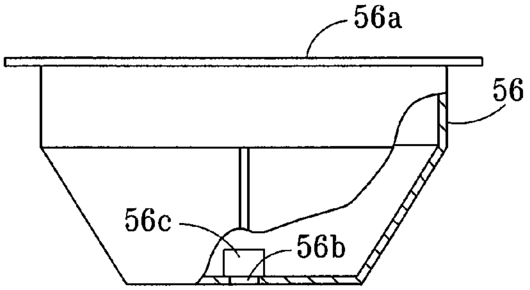
FIG. 10 is a front elevational view, partially in section, of the mix tank illustrated in FIG. 9 utilized with the present diluter system.
Figure 11:
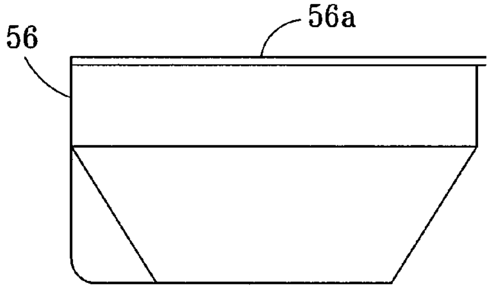
FIG. 11 is a side elevational view of the mix tank utilized with the present diluter system.

Base plate 66 also functions to receive a slide-in disposable component mix tank 56 (FIGS. 9-11). Mix tank 56 is also supported by a horizontal lower base plate 64 which is integral to face plate 65. Lower base plate 64 is further connected to face plate 65 utilizing support members 63. Outlet port 34 is integral with horizontal lower base plate 64.

Figure 14:
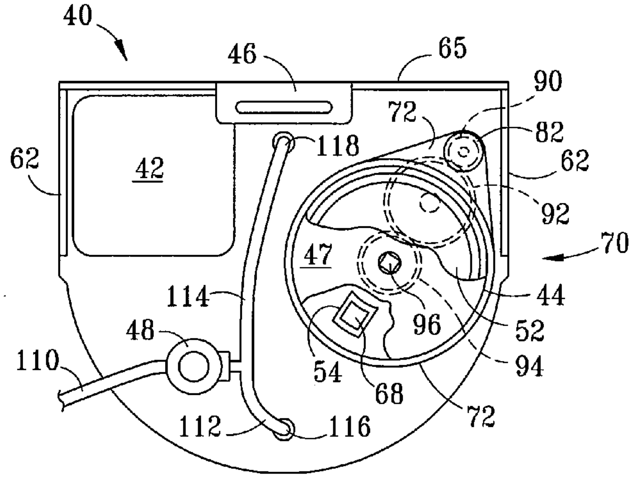
FIG. 14 is a top plan view of the components of the present diluter system mounted to the base.
Figure 15:
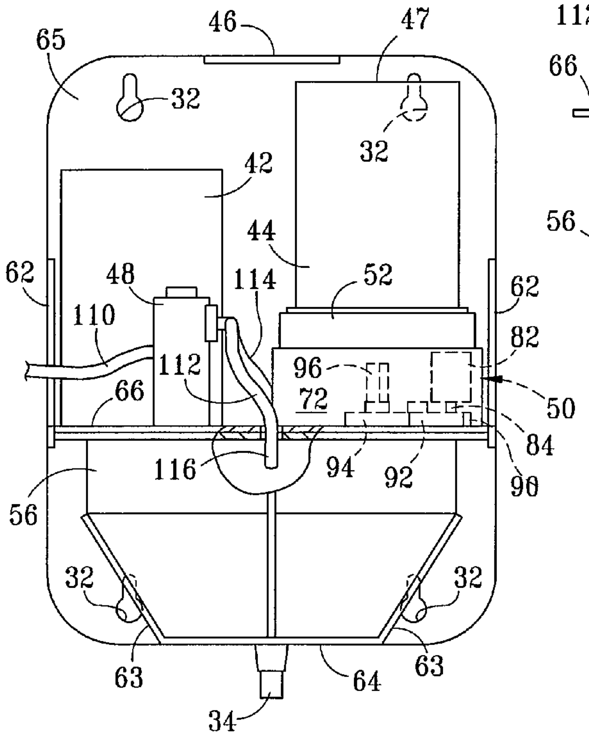
FIG. 15 is a front elevational view, partially in section, of the present diluter system illustrated in FIG. 14.
Figure 16:
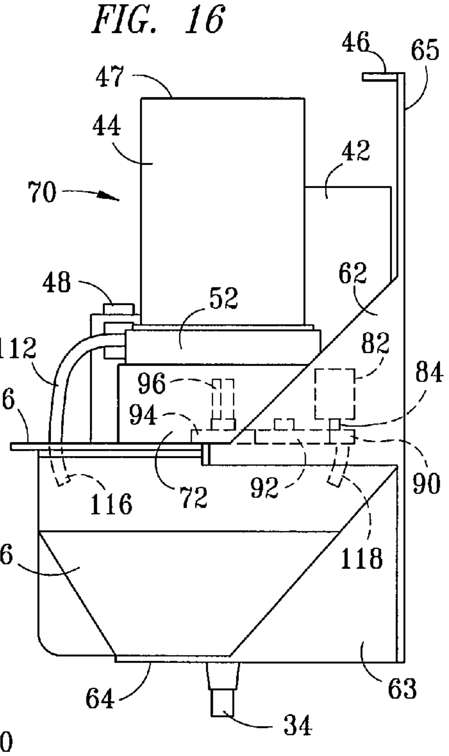
FIG. 16 is a side elevational view, partially in section, of the present diluter system illustrated in FIG. 14

Horizontal upper base plate 66 includes an aperture 68 through which measured chemical solids are dispensed by diluter system 20 into mix tank 56. Horizontal upper base plate 66 further includes apertures 69 through which fluid is dispensed into mix tank 56 utilizing nozzles 116 and 118 (FIG. 14-16).

Referring now to FIGS. 9-11, mix tank 56 is illustrated and is generally funnel or cone shaped. Mix tank 56 is disposable and recyclable, and includes an open top 56*a*, an outlet port 56*b* and a drain filter 56*c*. Mix tank 56 has a capacity calculated to provide sufficient volume for the proper dissolution of the chemical solids. Chemical solids flow via gravity into top 56*a* of mix tank 56, and with the addition of fluid, such as for example, water, the chemical solids are dissolved in mix tank 56. Drain filter 56*c* functions to retain any incompletely dissolve chemical solids.

Figure 12:
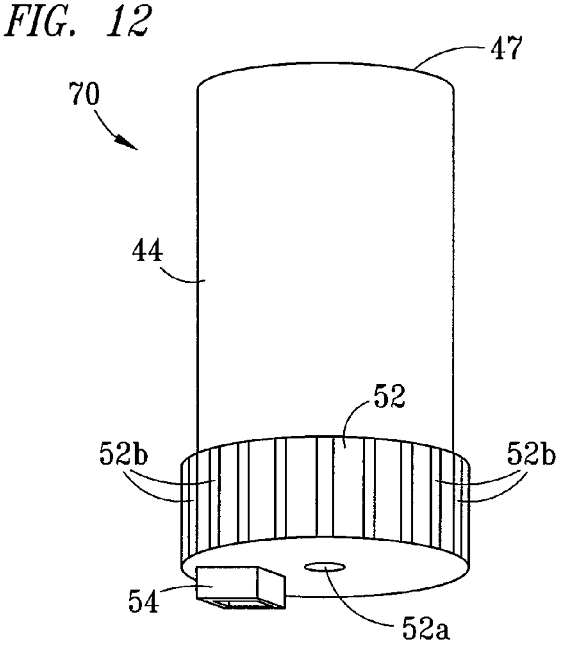
FIG. 12 is a perspective view of a chemical solids reservoir utilized with the present diluter system.

Referring to FIG. 12, diluter system 20 utilizes a chemical solids reservoir 70 which includes a bottle 44 in which the chemical solids component is shipped to the installation site or customer. When shipped, the bottle 44 contains an initial volume or weight of chemical solids. Chemical solids reservoir 70 becomes an integral assembly component of diluter system 20. Bottle 44 includes a lid 52. Lid 52 includes a drop port 54 which mates with aperture 68 (FIG. 6) in horizontal upper base plate 66 through which chemical solids are dispensed from bottle 44. Lid 52 further includes a drive shaft aperture 52*a*, and ribs 52*b* to be subsequently described with respect to FIG. 13. Bottle 44 may be discarded and recycled following dispensing of all chemical solids contained within bottle 44 following service intervals.

Figure 13:
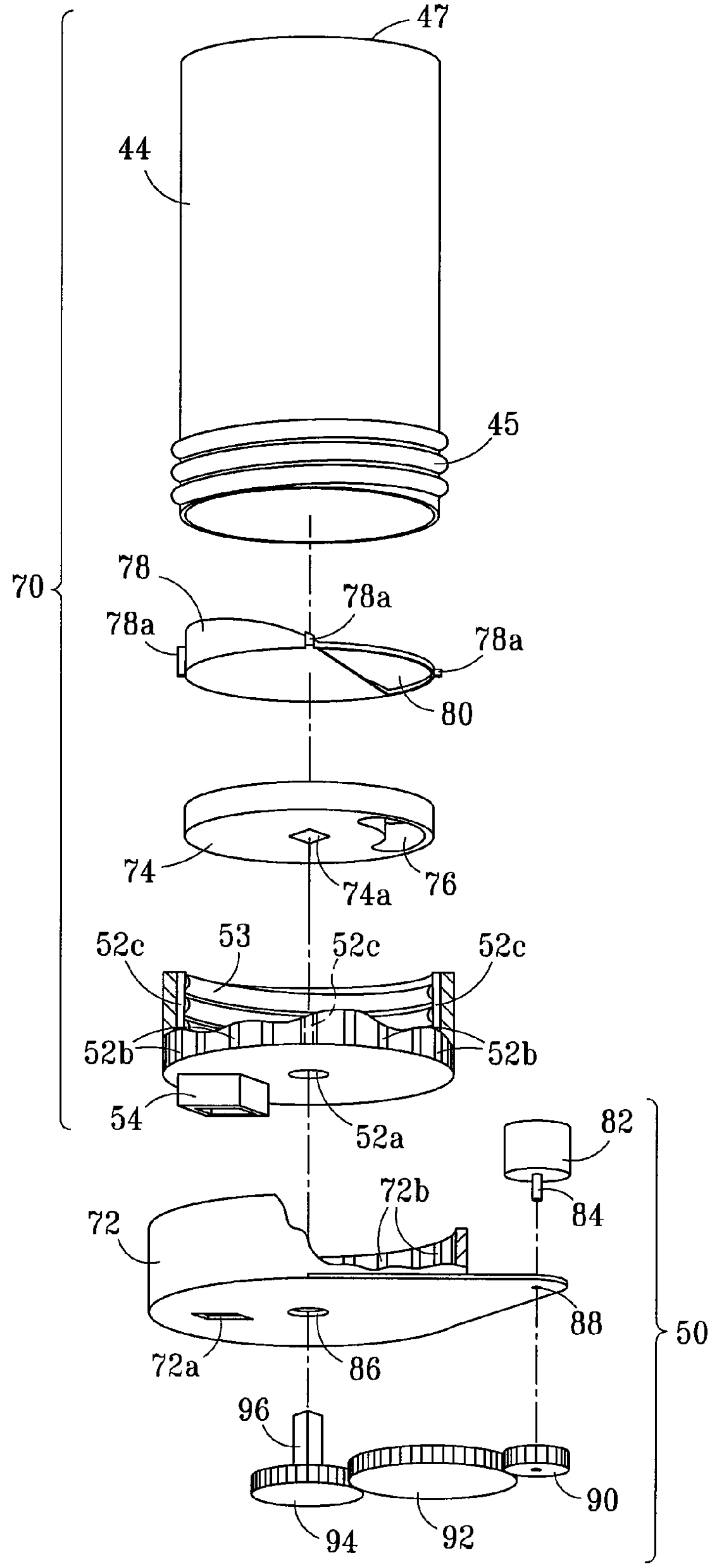
FIG. 13 is an exploded perspective view of the chemical solids reservoir illustrated in FIG. 12 utilized with the present diluter system.

Referring now to FIG. 13, bottle 44 is selectively attached to horizontal upper base plate 66 utilizing a feeder drive base 72 mounted above mix tank 56. A feeder aperture 72*a* contained within base 72 through which chemical solids pass is aligned with drop port 54 of lid 52 and aperture 68 of horizontal upper base plate 66.

Base 72 also includes apertures 86 and 88. Base 72 further includes interiorally disposed slots 72*b*. Lid 52 of bottle 44 is secured to base 72 by ribs 52*b* of lid 52 positioned within slots 72*b* of base 72 to form a matching ribbed interlocking friction fitments between lid 52 and base 72. Removal of bottle 44 is facilitated by simply lifting up bottle 44 from base 72. Lid 52 of bottle 44 is disposable and recyclable and may be replaced when necessary during normal interval maintenance.

Lid 52 includes female threads 53 for attachment to male threads 45 on bottle 44. Disposed between lid 52 and bottle 44 is a rotating feeder cup 74 and a chemical solids dam 78. Rotating feeder cup 74 includes a slot 76 and a drive shaft port 74*a*. Chemical solids dam 78 includes a slot 80 and ribs 78*a*. Chemical solids dam 78 is locked into place by receiving keyed receivers 52*c* notched into lid 52. The position of keyed receiver notches 52*c* positions chemical solids dam 78 as an excluding interfacial slanted dam between rotating feeder cup 74 and the chemical solids contained within bottle 44. Alignment of slot 76 of rotating feeder cup 74 with aperture 80 of chemical solids dam 78 permit chemical solids contained within bottle 44 to pass into lid 52, rotate around into alignment with port 54, exit lid 52 through port 54, and then subsequently pass through feeder aperture 72*a* of feeder drive base 72, and through aperture 68 of horizontal upper base plate 66 into mix tank 56. Chemical solids dam 78 also functions as a moisture barrier which prevents moisture entering bottle 44 which could cause clumping or swelling of the chemical solids contained within bottle 44 and subsequent failure of the reservoir 70.

Rotating feeder cup 74 is actuated via a feeder gear drive assembly 50. Feeder gear drive assembly 50 includes a drive motor 82 and an output shaft 84. Output shaft 84 passes through aperture 88 within feeder drive base 72 and is connected to a gear drive set including gears 90, 92 and 94. Gear 94 includes a drive shaft 96 which passes through aperture 86 of feeder drive base 72 and drive shaft aperture 52*a* of lid 52 for engagement with drive shaft port 74a of rotating feeder cup 74. Motor 82 is actuated either manually or automatically, cycling drive shaft 96 360° from 0° predetermined (start) to 360° (stop). During the rotation of rotating feeder cup 74, rotating feeder cup 74 receives chemical solids as they emerge from slot 80 of chemical solids dam 78. Motor 82 can be actuated to cycle on and off at predetermined times, causing rotating feeder cup 74 to complete one revolution for every predetermined time period, such as once per hour or once per day.

Slot 76 is sized to receive a measured amount of chemical solids from bottle 44. Chemical solids migrate into and fill slot 76 of rotating feeder cup 74 via gravity feed to a specific weight range or volume of chemical solids based on the size of slot 76 and the density of the particular chemical being used, which determines the measured amount of solids. The measured amount of chemical solids will be less than the initial volume or weight of solids in the bottle 44 when shipped, so that all of the chemicals in the bottle can be dispensed over a service interval, such as a month. Chemical solids are held in slot 76 by lid 52. As feeder cup 74 continues to rotate, due to rotation of gear 94 through actuation of motor 82, the 360° rotation rotates slot 76 over port 54 of lid 52 so that the chemical solids, by gravity, are released from lid 52 into mix tank 56 for dissolution. Rotating feeder cup 74 blocks the flow of chemical solids from bottle 44 and through aperture 80 of chemical solid dam 78 until slot 76 once again aligns with slot 80. Feeder cup 74 completes one revolution at predetermined time intervals based on the cycling on and off of motor 82, causing a measured amount of chemical solids to be dispensed from bottle 44 to mix tank 56 at those predetermined time intervals. This allows the contents of bottle 44 to be dispensed in small amounts every hour or day, for example, until the entire contents are emptied in a longer service interval, such as every month. The amount of measured chemical solids dispensed from bottle 44 may be modified by adjusting the size of slot 76 and/or altering the rotational speed of drive shaft 96 to increase or decrease the length of the predetermined time intervals for dispensing solids over the longer service interval.

Feeder driver base 72, rotating feeder cup 74 and chemical solids dam 78 are all disposable and recyclable components that may be replaced whenever it is necessary during normal interval maintenance or when cleaning is required.

Referring now to FIGS. 14-16, chemical solids reservoir 70 and feeder gear drive assembly 50 are illustrated attached to horizontal upper base plate 66, and in alignment with mix tank 56. Also illustrated in FIGS. 14-16 is a battery 42 and control solenoid 48. Solenoid 48 controls the flow of fluid to jet inlets of water jet nozzles 116 and 118 which create flow streams through apertures 69 of horizontal upper base plate 66 for providing fluid flow into mix tank 56 for dissolution of the chemical solids originally contained within bottle 44. Nozzles 116 and 118 create a spinning water movement within mix tank 56. Dissolution fluid from a fluid source flows to solenoid 48 via a fluid supply tube 110 which passes through an aperture in cover 30. Fluid flows out of solenoid 48 via tubes 112 and 114 to nozzles 116 and 118, respectively.

We claim:

1. A chemical diluter system comprising:

a housing;

a chemical solids reservoir comprising an initial volume of chemical solids, a bottle having a lid releasably secured thereto, said lid including a discharge aperture; and a rotating cup disposed between said lid and said bottle, said cup including a slot for receiving chemical solids and for transporting chemical solids to said lid discharge aperture, wherein the reservoir is at least partially disposed within said housing, said reservoir automatically dispensing a measured amount of chemical solids stored within the reservoir at predetermined time intervals, the measured amount being less than the initial volume of chemicals in the reservoir;

a mixing tank disposed within said housing and adjacent to said reservoir, said mixing tank having an inlet port to receive chemical solids from the reservoir and an outlet port;

a nozzle for discharging fluid to the mixing tank from a source external to the housing, the fluid mixing with and dissolving the chemical solids received in the mixing tank; and wherein said outlet port of said mixing tank dispenses a diluted chemical solution of said chemical solids.

2. The chemical diluter system of claim 1 and further including:

a motor;

a drive gear attached to said motor; and a drive shaft attached to said drive gear for rotating said cup between a fill position and a discharge position.

3. The chemical diluter system of claim 2 wherein the chemical solids reservoir further comprises:

a slanted dam disposed between said cup and said bottle for directing chemical solids to said cup.

4. The chemical diluter system of claim 1 further including a second nozzle, wherein the first nozzle and second nozzle are disposed at locations that are substantially opposite from each other around an outer perimeter of the mixing tank for directing fluid to said mixing tank.

5. The chemical diluter system of claim 1 wherein said mixing tank includes a funnel portion disposed between said inlet port and said outlet port.

6. The chemical diluter system of claim 1 wherein:

said lid comprises a plurality of ribs; and said housing includes a base for said reservoir, said base including a plurality of slots for receiving said lid ribs.

7. The chemical diluter system of claim 3 further comprising a base having a feeder aperture therein.

8. The chemical diluter system of claim 7 wherein:

the dam further comprises a slot;

the measured amount of chemical solids are dispensed from the reservoir through the slot in the dam and into the slot in the cup when the slots are aligned;

the measured amount of chemical solids are dispensed from the slot in the cup into the mixing tank through the feeder aperture in the base when the slot in the cup is aligned with the feeder aperture;

the measured amount of chemical solids is determined by the size of the slot in the cup; and the rate of rotation of the drive shaft, which brings the slot in the cup into and out of alignment with the slot in the dam and feeder aperture at different times, determines the time intervals for dispensing the chemical solids into the mixing tank.

9. The chemical diluter system of claim 7 wherein said lid discharge aperture is slidably engageable with the feeder aperture so that the entire reservoir is disengageable from the base by sliding the reservoir upward until the lid discharge aperture is clear of the feeder aperture.

10. The chemical diluter system of claim 4 wherein the nozzles are oriented to create a spinning movement of the fluid and chemicals in the mixing tank.

* * * * *